(12) United States Patent
Stobbe et al.

(10) Patent No.: US 7,391,360 B2
(45) Date of Patent: Jun. 24, 2008

(54) METHOD FOR LOCATING A DETECTION MICROCHIP

(75) Inventors: Anatoli Stobbe, Barsinghausen (DE); Andreas Werner, Hannover (DE); Holger Merk, Barsinghausen (DE)

(73) Assignee: ASTRA Gesellschaft für Asset Management mbH & Co. KG, Barsinghausen (DE)

( * ) Notice: Subject to any disclaimer, the term of this patent is extended or adjusted under 35 U.S.C. 154(b) by 0 days.

(21) Appl. No.: 11/364,656

(22) Filed: Feb. 28, 2006

(65) Prior Publication Data

US 2006/0220861 A1   Oct. 5, 2006

(30) Foreign Application Priority Data

Feb. 28, 2005   (DE)   ................. 10 2005 009 579

(51) Int. Cl.
- *G01S 13/87* (2006.01)
- *G01S 13/84* (2006.01)
- *G01S 13/75* (2006.01)

(52) U.S. Cl. .................................... 342/107
(58) Field of Classification Search ................ 342/107, 342/109, 112, 105, 146, 194, 125, 126, 165, 342/173, 174; 340/572.1
See application file for complete search history.

(56) References Cited

U.S. PATENT DOCUMENTS

| | | | |
|---|---|---|---|
| 7,030,761 B2* | 4/2006 | Bridgelall et al. | 340/572.1 |
| 7,119,738 B2* | 10/2006 | Bridgelall et al. | 340/572.1 |
| 7,170,412 B2* | 1/2007 | Knox et al. | 340/572.1 |
| 7,242,293 B2* | 7/2007 | Rea et al. | 340/572.1 |
| 2005/0190098 A1* | 9/2005 | Bridgelall et al. | 342/146 |
| 2005/0206555 A1* | 9/2005 | Bridgelall et al. | 342/127 |
| 2005/0237953 A1* | 10/2005 | Carrender et al. | 342/127 |
| 2006/0044147 A1* | 3/2006 | Knox et al. | 340/572.1 |
| 2006/0107307 A1* | 5/2006 | Knox et al. | 726/2 |
| 2006/0114104 A1* | 6/2006 | Scaramozzino | 340/10.2 |
| 2006/0220861 A1* | 10/2006 | Stobbe et al. | 340/572.1 |
| 2006/0244601 A1* | 11/2006 | Nishimura | 340/572.4 |
| 2006/0284727 A1* | 12/2006 | Steinke | 342/127 |
| 2007/0001814 A1* | 1/2007 | Steinke et al. | 340/10.31 |
| 2007/0023520 A1* | 2/2007 | Miyashita | 235/451 |
| 2007/0096876 A1* | 5/2007 | Bridgelall et al. | 340/572.1 |
| 2007/0120682 A1* | 5/2007 | Rea et al. | 340/572.8 |

FOREIGN PATENT DOCUMENTS

DE    199 46 161 A1    4/2001
EP    1696245 A2 *    8/2006

\* cited by examiner

*Primary Examiner*—Dan Pihulic
(74) *Attorney, Agent, or Firm*—Collard & Roe, P.C.

(57) ABSTRACT

A method is described for locating a detection microchip that transmits a detection signal, which is received and evaluated by a reader. The current distance between the reader and the detection microchip is determined from a run-time dependent feature of the received detection signal and the propagation speed of electromagnetic waves.

16 Claims, 2 Drawing Sheets

METHOD FOR LOCATING A DETECTION MICROCHIP

BACKGROUND OF THE INVENTION

The invention relates to a method for locating a detection microchip.

Detection microchips that are attached to products and store unique identifying information are being used increasingly for the identification of goods that are kept in stock and being transported. The goods can be identified by reading the identification information via a reader.

If multiple products are contained in a transport or storage unit of extensive physical space, detection microchips and readers having a sufficiently large detection range are needed for the identification. A method for isolating them must also be implemented. Detection microchips and readers that operate at frequencies in the UHF range and above satisfy the prerequisites for this. In this frequency range, it is possible to achieve both the physical range and a sufficiently high data transmission rate to be able to isolate and read separately all the detection microchips that are located in the desired detection range at the same time, and to do so within an acceptable period of time.

However, since field propagation in the UHF range can be inhomogeneous due to reflection and absorption, the transmission power and reception sensitivity of the reader must be sufficient to allow the detection microchips to be read reliably even under unfavourable constellations in the desired detection range. As a result, the problem arises that the capture field cannot be restricted in targeted manner to a selected transport or storage unit when there are multiple transport or storage units, but instead also detects adjacent transport or storage units. Thus, in order to be able to distinguish products of a selected transport or storage unit from products of other transport or storage units, the microchips attached to the products must therefore also be located and then selected after they have been read.

SUMMARY OF THE INVENTION

The object of the present invention is to provide a method for locating a detection microchip that enables detection of at least one spatial coordinate.

The invention is based on a detection microchip that emits a detection signal, which is received and evaluated by a reader. This may be a passive detection microchip, which changes the carrier signal of the reader into cycles of modulation in amplitude and/or phases, or an active detection microchip, whose detection signal includes a carrier that is generated synchronously with the carrier signal of the reader.

Because of the final propagation speed of electromagnetic waves, run-time-dependent features of the detection signal are altered on the way from the detection microchip to the reader. In this context, the change in the run-time is proportional to the distance between the detection microchip and the reader. Analysing the run-time-dependent characteristic of the detection signal received by the reader in conjunction with the known propagation speed of electromagnetic waves enables the distance to be determined.

The phase and amplitude of the received detection signal are preferably evaluated as the run-time-dependent characteristic of the detection signal.

In this case, the run-time-dependent characteristic may be analysed following demodulation, which is necessary anyway for data acquisition, and thus also in a lower frequency range than the frequency of the carrier signal.

In a first embodiment of the method, at least during a locating period the detection microchip receives a carrier signal from the reader and transmits a detection signal that is modulated with a modulation signal and has the same frequency as the carrier signal. The modulation signal has signal points that may be approximated by a straight line in a signal space diagram. The detection signal received by the reader is demodulated, the difference between the phase angle of the detection signal at a current distance and a reference distance between the detection microchip and the reader is determined, and the current distance between the detection microchip and the reader is determined from the difference in the phase angle, the carrier frequency and the propagation speed of the electromagnetic waves.

This instruction, that the modulation signal has signal points that are approximable in a signal space diagram by a straight line, enables the phase angle of the detection signal to be reproduced. The transition between the signal points does not have to be approximable by a straight line. Outside of the locating period, other modulation modes may also be used in which the signal points may lie anywhere in a signal space diagram.

The final propagation speed of electromagnetic waves gives rise to a time difference between the output of the detection signal and its reception at the reader, which in turn results in a difference between the phase angle of the carrier signal produced by the reader and the phase angle of the detection signal of the same frequency that is received by the reader. This difference in the phase angles is a measure of the distance between the detection microchip and the reader.

Since the difference between the phase angles also depends on the frequency of the carrier signal, short wavelengths in the UHF range yield a large enough value for the difference between the phase angles to make it possible technically to measure a distance having a resolution in the cm range. Signal run times inside the reader and detection microchip may be considered constant and do not affect the difference between phase angle changes when there are changes in distance.

The following abbreviations are used for the mathematical description of the signals:

a Distance between detection microchip and reader
f Carrier frequency of the reader
c Propagation speed of waves in air
t Runtime of the signal from the reader to the detection microchip and back
$\lambda$ Wavelength of the carrier frequency; $\lambda = c/f$
T Oscillation period at f; $T = 1/f$
$\pi$ pi
$\alpha$ Phase angle; $\alpha = 2\pi * t/T$
N 0, 1, 2 ... Ambiguity of the phase angle The equation $t = 2*a/c$ results for the run-time and, after conversion, the equation $a = t*c/2$ for the distance. Taking into account the phase angle, it follows that for the run-time $t = (\alpha/2\pi + N)*T$ and, after conversion, for the distance $a = (\alpha/2\pi + N) *T*c/2$ or $a = (\alpha/2\pi + N)*1/f*c/2$ or $a = \alpha*c/4\pi f$ for $N = 0$.

For a carrier frequency f, the phase angle takes on the same value again after a segment $\lambda/2$. Segment $\lambda/2$ results from the fact that run-time t of the signal includes both the path from the reader to the detection microchip and the path back from the microchip to the reader. Within a segment $<\lambda/2$, the difference of the phase angles between a current distance and a reference distance is unambiguous. For a segment $>\lambda/2$, ambiguities N occur that can be resolved by continuous updating of the position of the detection microchip in steps $<\lambda/2$.

Another possibility for eliminating ambiguities with segments $>\lambda/2$ is described in a second embodiment of the method. At least during a locating time frame, the detection microchip receives signals of a first frequency and then of at least one second frequency from the reader carrier, and transmits detection signals that are each modulated with a modulation signal, each of which have the same frequency as the carrier signals. The modulation signals have signal points that are approximable by a straight line in a signal space diagram. The detection signals received by the reader are demodulated, the respective phase angle of the detection signal in question is determined and the current distance between the detection microchip and the reader is determined via joint analysis from the phase angles, the carrier frequencies and the propagation speed of the electromagnetic waves.

Alternatively, the detection microchip may receive carrier signals of a first and simultaneously at least one second frequency from the reader and simultaneously transmit detection signals that are each modulated with a modulation signal. The detection signals received from the reader are separated and demodulated via filters, the respective phase angle of each detection signal is determined at the same time.

Unlike a staggered emission, simultaneous transmission of detection signals at various frequencies prevents time-variable influences of the reading field and the distance from affecting the analysis result.

Different phase angles occur at equal distances for different frequencies. Since the phase angles at these different frequencies are proportional to the distance, the difference between the phase angles is also proportional to the distance. Accordingly, the distance is obtained not just for the absolute phase angle at a frequency, but also for the difference between the phase angles when there is a difference between various frequencies.

Then, a reference distance is not necessary. Sources of interference due to effects that are not constant over the long term are eliminated by the formation of differences. However, greater precision is needed when determining the phase angles.

The following abbreviations are used for further mathematical description of the signals:
$f_1$, $f_2$, Carrier frequencies of the reader
$\lambda_1$, $\lambda_1$, Wavelength of the carrier frequency; $\lambda_{1,2}=c/f_{1,2}$
$\alpha_1$, $\alpha_2$ Phase angles; $\alpha_1$, $\alpha_2=2\pi*t/T_{1,2}$ The formula for the distance at two different phase angles and carrier frequencies is then:

$$a=(\alpha_1-\alpha_2)*c/4\pi(f_1-f_2)$$

Only at segments $|\lambda_2-\lambda_1|>\min(\lambda_{1,2})$ do ambiguities again occur.

By appropriate selection of the carrier frequency, a distance range can be detected without ambiguities in the UHF range within the reachable space of the reading field, which is limited by the typically low transmission power of the reader. In readers having a greater reading range or at higher carrier frequencies, the phase angle may also be measured at more than two carrier frequencies in order to resolve these ambiguities.

According to a further development, the phase angle may be determined at least twice during the locating period with a time interval, and a change of the phase angle in the time interval may be determined as a relative movement between the reader and the detection microchip, while a correspondence may be determined as a constant distance between the reader and the detection microchip.

Using time-offset distance measurements, a criterion is determined as to whether the reader and detection microchip are moving in distance relative to each other. One possibility for using this criterion consists in distinguishing products furnished with detection microchips on a movable transport unit, e.g. a pallet on a fork lift, from stationary products furnished with detection microchips, e.g. on pallets on a rack.

Moreover, the speed and/or directional vector of the movement may be determined from the magnitude of the change in the distance or phase angle within a time interval.

In a technical implementation of the method, the detection signal is modulated during the locating period with a signal that switches between two states, e.g. A and B. The detection signal received by the reader is split into an in-phase and a quadrature component by multiplying with a signal that is synchronous with the carrier frequency. The in-phase component of the modulation signal is derived from the difference between the signal portions of the at least two states for the in-phase component, and the quadrature component of the modulation signal is derived from the difference between the signal portions of the at least two states for the quadrature component. The phase angle is then determined trigonometrically.

The following abbreviations are used for the mathematical description of the signals:
X(t) the amplitude curve of the unmodulated carrier signal
$U_{IN-A}$ reception signal in modulator state A
$U_{IN-B}$ reception signal in modulator state B
$U_A$ signal portion A affected by the detection microchip
$U_B$ signal portion B affected by the detection microchip
$U_{KI}$ signal portion of the in-phase component that is affected by the unmodulated carrier signal
$U_{KQ}$ signal portion of the quadrature component that is affected by the unmodulated carrier signal
$U_{AI}$ signal portion A of the in-phase component that is affected by the detection microchip
$U_{AQ}$ signal portion A of the quadrature component that is affected by the detection microchip
$U_{BI}$ signal portion B of the in-phase component that is affected by the detection microchip
$U_{BQ}$ signal portion B of the quadrature component that is affected by the detection microchip
$U_I$ in-phase component of the modulation signal
$U_Q$ quadrature component of the modulation signal
$\phi$ phase generally
$\phi_A$ phase of the signal portion A that is affected by the detection microchip
$\phi_B$ phase of the signal portion B that is affected by the detection microchip An unmodulated carrier signal with form X(t)=cos(2πft) =cos(x(t)) is generated by the reader and passed to the detection microchip. A modulator in the detection microchip modulates the carrier signal with a modulation signal that switches between the at least two states A and B. Besides the carrier signal, the reader also receives a portion of the modulated detection signal via direct coupling and reflection. The reception signal in modulator state A is:

$$U_{IN-A}=U_A*\cos(x+\phi_A)+U_{KI}*\cos(x)+U_{KQ}*\sin(x).$$

The reception signal in modulator state B is:

$$U_{IN-B}=U_B*\cos(x+\phi_B)+U_{KI}*\cos(x)+U_{KQ}*\sin(x).$$

In an I/Q demodulator, the input signal is multiplied by a reference signal and a reference signal that is phase-shifted through 90°. The result of the multiplication in the generally standardized form for the I-component reads:

$$\cos(x)*\sin(x+\phi)=-\tfrac{1}{2}*\sin(\phi)+\tfrac{1}{2}*\sin(2x+\phi)$$

and for the Q-component:

$$\sin(x)*\sin(x+\phi)=+\tfrac{1}{2}*\cos(\phi)-\tfrac{1}{2}*\cos(2x+\phi)$$

In this context the expression sin(x+p) stands for the reception signal and the expressions sin(x) or cos(x) represent the reference signal or its phase-shifted equivalent. The 2x in the last term stands for the signal portions of the doubled carrier frequency, which are then suppressed by low-pass filters.

For the signal $$U_{IN-A}=U_A*\cos(x+\phi_A)+U_{KI}*\cos(x)+U_{KQ}*\sin(x)$$

the following are then produced by multiplication for the I-channel:

$$\cos(x)*U_{IN-A}=U_{AI}$$
$$=U_A/2*\cos(\varphi_A)+U_A/2*\cos(2x+\varphi_A)+$$
$$U_{KI}/2*\cos(0)+U_{KI}/2*\cos(2x)-$$
$$U_{KQ}/2*\sin(0)+U_{KQ}/2*\sin(2x)$$

and for the Q-channel:

$$\sin(x)*U_{IN-A}=U_{AQ}$$
$$=U_A/2*\sin(\varphi_A)+U_A/2*\sin(2x+\varphi_A)+$$
$$U_{KI}/2*\sin(0)+U_{KI}/2*\sin(2x)+$$
$$U_{KQ}/2*\cos(0)-U_{KQ}/2*\cos(2x).$$

For the signal $$U_{IN-B}=U_B*\cos(x+\phi_B)+U_{KI}*\cos(x)+U_{KQ}*\sin(x)$$

the following are then produced by multiplication for the I-channel:

$$\cos(x)*U_{IN-B}=U_{BI}$$
$$=U_B/2*\cos(\varphi_B)+U_B/2*\cos(2x+\varphi_B)+$$
$$U_{KI}/2*\cos(0)+U_{KI}/2*\cos(2x)-$$
$$U_{KQ}/2*\sin(0)+U_{KQ}/2*\sin(2x)$$

and for the Q-channel:

$$\sin(x)*U_{IN-B}=U_{BQ}$$
$$=U_B/2*\sin(\varphi_B)+U_B/2*\sin(2x+\varphi_B)+$$
$$U_{KI}/2*\sin(0)+U_{KI}/2*\sin(2x)-$$
$$U_{KQ}/2*\cos(0)+U_{KQ}/2*\cos(2x).$$

By separating out the high-frequency portions, the following expressions remain for the I-channel:

$$U_{AI}=U_A/2*\cos(\phi_A)+U_{KI}/2$$

$$U_{BI}=U_B/2*\cos(\phi_B)+U_{KI}/2$$

and for the Q-channel:

$$U_{AQ}=U_A/2*\sin(\phi_A)+U_{KQ}/2$$

$$U_{BQ}=U_B/2*\sin(\phi_A)+U_{KQ}/2.$$

The signal portion $U_{KI}$ or $U_{KQ}$ affected by the unmodulated carrier signal is removed by subtraction, and the in-phase component of the modulation signal $U_I$ and the quadrature component of the modulation signal $U_Q$ remain as the only variables that are measured following a low-pass filtering.

$$U_I=U_B/2*\cos(\phi_B)-U_A/2*\cos(\phi_A)$$

$$U_Q=U_B/2*\sin(\phi_B)-U_A/2*\sin(\phi_A)$$

The phase angle of the current distance relative to the reference phase angle of a reference distance is then yielded as $\alpha=\arctan(U_Q/U_I)$.

Phase shifts are incorporated in the phase angle $\alpha$ due to run times when the signal is processed inside the reader and the detection microchip. However, these phase shifts are compensated by reference to a reference phase at a reference distance.

Given that modulation states A and B are able to be assigned, $a=\alpha*c/4nf$ for a segment $<\lambda/2$. If states A and B are able to be distinguished from one another but not assigned, only an angle range from 0° to 180° is unique for $\alpha$. Ambiguities then occur at distances as short as $\lambda/4$.

Further, a resulting amplitude value of the detection signal may be determined from the in-phase and quadrature components of the individual measured values via $U^2=U_I^2+U_Q^2$.

In this way, the calculated distance values may be verified additionally. Moreover, a comparative quality test of detection microchips during production and use is possible by analysing the amplitude of the detection signal for a known distance. The amplitudes may be analysed over a large frequency range, for example to gauge resonance frequency and quality.

According to a further development, in order to make an assignment to the at least two modulation states A and B, the signal portions of the at least two states may be evaluated over at least one evaluation period with at least two evaluation functions that contain an expected signal sequence. An evaluation result that returns a maximum amplitude is evaluated as the amplitude of the signal portions of the at least two states.

If the received signal sequence corresponds to the expected signal sequence and if the received signal sequence is evaluated phase-synchronously with the evaluation functions that contain the expected signal sequence, e.g. by multiplication, the evaluation result returns a maximum positive value, which corresponds to an amplitude value. Otherwise, the evaluation result supplies a positive value that is smaller than the maximum positive value or even a negative value. If the evaluation is performed with two or more evaluation functions, different evaluation results are thus produced. The probability that the at least two states A and B are correctly assigned is largest for the evaluation result with the maximum amplitude.

A special case occurs if only two evaluation functions are used and are distinguished only by a constant factor. An evaluation with the second evaluation function then corresponds to a multiplication of the result of evaluation of the first evaluation function by this factor.

The amplitudes of the signal portions of the at least two states may be averaged over multiple evaluation periods.

Interference portions are reduced, thereby improving measurement precision, by averaging.

A reference detection microchip may be disposed at a reference distance from the reader in the vicinity of the detection microchips to be identified. A correction value may be determined by comparing the measured phase angle to a reference phase angle for the reference distance, and the measured phase angle of the detection microchips to be identified may be corrected using the correction value.

In this way, effects on the phase angle, such as by reflections of the carrier signal and/or the detection signal on objects, may be compensated.

The reference detection signal of the reference detection microchip may be modulated with a modulation signal that differs from the modulation signal of the detection microchip to be identified, and in the reader the reference detection signal of the reference detection microchip and the detection signal of the detection microchip to be identified may be separated by filters and evaluated simultaneously.

Temporally changeable effects of the reading field on the analysis result are avoided by simultaneous analysis of the reference detection signal of the reference detection microchip and of the detection signal of the detection microchip to be identified, compared to a staggered analysis.

According to a further development, multiple distance measurements are carried for no less than two different antenna positions of the reader, and the position of the detection microchip may be determined from the intersection points of the distance position curves of the antenna positions of the reader as determined by distance measurements.

In this context, the different antenna positions may be controlled by switching between multiple positionally separated antennae of the reader.

Locating is further improved via the distance measurements with different antenna positions because the direction between reader and detection microchip may be determined as well as the distance.

In addition, the radiation lobe of an antenna array comprising at least two positionally separated antennae is aligned after the position of the detection microchip has been determined by phase-shifted control of the antennae in the direction of the detection microchip.

The reading field strength and the noise ratio are increased simultaneously compared to possible interference radiation from other directions by aligning the radiation lobe. In this way, the reading quality of the detection signals is improved, which also has a favourable effect on the accuracy of the distance measurement and any additional directional measurements.

Furthermore, the detection microchip may be activated by the reader from at least two different antenna positions before the distance measurement. In addition or alternatively thereto, the detection microchip may be activated by the reader on at least two different carrier frequencies before the distance measurement.

In the UHF range, the reading field strength may exhibit minima due to shadowing or stationary waves caused by reflections. If a detection microchip happens to be located at the position of such a minimum, there is a danger that the detection microchip may not be able to be identified. The distribution of the reading field strength is changed by using different antenna positions and/or carrier frequencies. As a result, the probability of being able to identify detection microchips is increased.

BRIEF DESCRIPTION OF THE DRAWINGS

The invention will described in the following with reference to exemplary embodiments that are depicted in the drawing. In the drawing.

DETAILED DESCRIPTION OF THE PREFERRED EMBODIMENT

Figure 1:
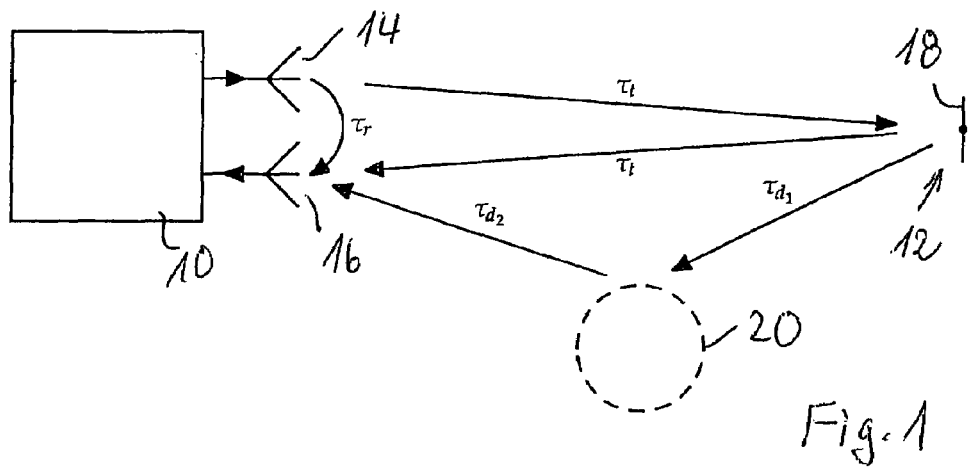
FIG. 1 shows an arrangement of a reader and a detection microchip with a representation of signal components.

FIG. 1 shows an arrangement of a reader 10 and a detection microchip 12 with a representation of signal components. Reader 10 includes a transmitter, which transmits a carrier signal via a transmission antenna 14, and a receiver having a receiving antenna 16, a demodulator and an analysis circuit. Detection microchip 12 includes a detection microchip antenna 18, a control circuit, a memory and a modulator. Detection microchip 12 may be a passive detection microchip supplied with energy from reader 10 or a detection microchip having its own power source.

The modulator of detection microchip 12 modulates the carrier signal of reader 10 by in-time attenuation of its modulation content. This represents a usable signal component, which travels as a detection signal having run time $\tau_t$ from detection microchip 18 to receiving antenna 16 of reader 10.

In addition, components of the carrier signal having run time $\tau_r$ also arrive at receiving antenna 16 of reader 10 even by direct coupling from transmission antenna 14 and by reflections of the carrier signal having run time $\tau_{d2}$ on objects 20. Reflections of the detection signal having run time $t_{d1}$ may also occur on objects 20, but they are not considered further in the following.

Figure 2:
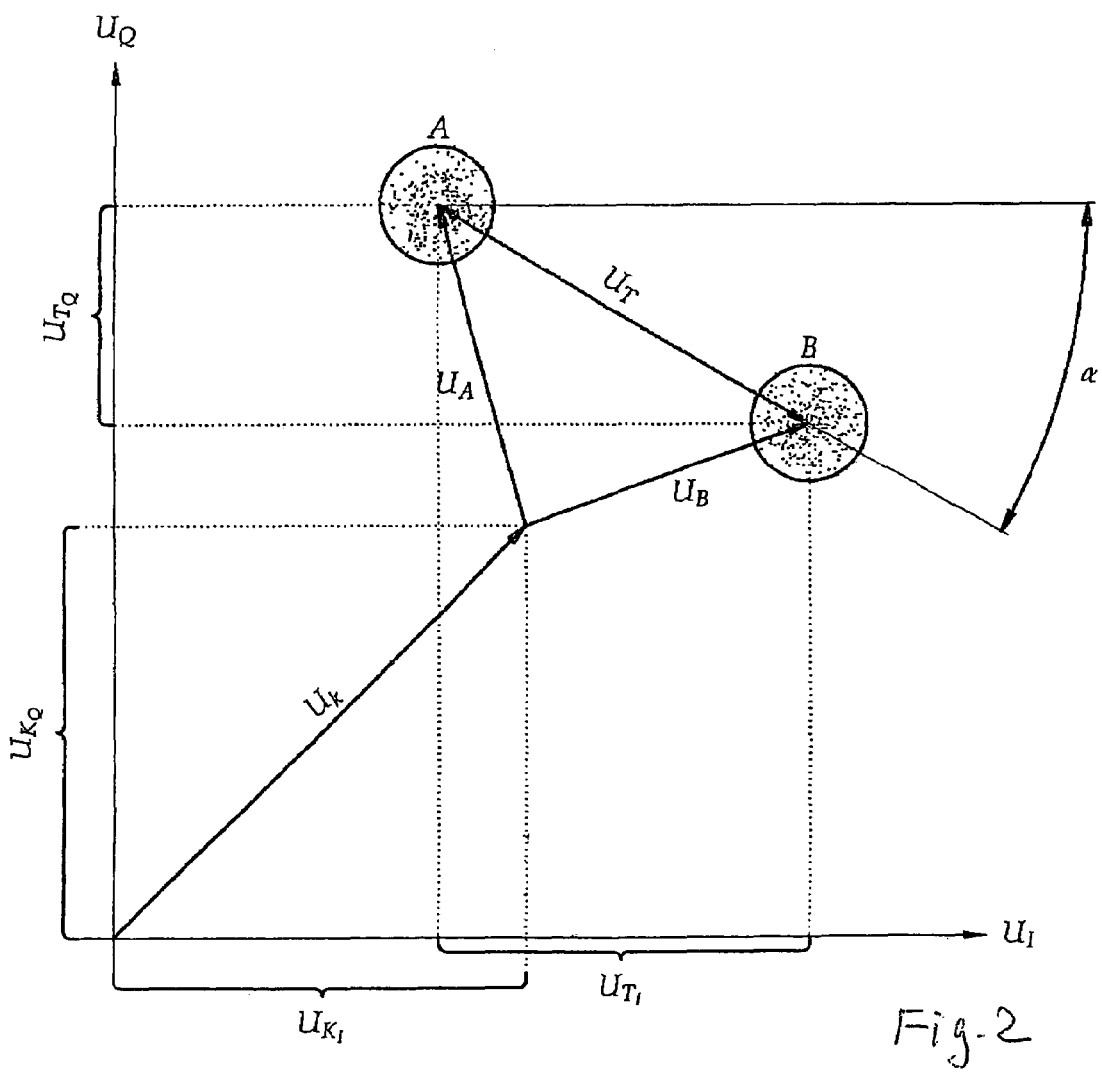
FIG. 2 shows a phasor diagram of the signal components at the input of the reader.

FIG. 2 shows a phasor diagram of the signal components at the receiving antenna of the reader. In this context, the components of the carrier signal as direct coupling on the reception antennae and the components formed by reflections of the carrier signal on objects are combined in component $U_K$ and are comprised in the complex phasor diagram of an in-phase component $U_{KI}$ and a quadrature component $U_{KQ}$. These components are not modulated by the detection microchip.

In the detection microchip, the carrier signal is modulated with a modulation signal that switches in the exemplary embodiment between two modulation states A and B and is represented by an index $U_A$ for modulation state A and an index $U_B$ for modulation state B. The modulated component formed by the detection signal is shown as component $U_T$, constituted in the complex phasor diagram of an in-phase component $U_{TI}$ and a quadrature component $U_{TQ}$. Interference portions of the transmission path affect the position of modulation states A and B in the complex phasor diagram, which is shown by circular areas with several diffusing values.

Figure 3:
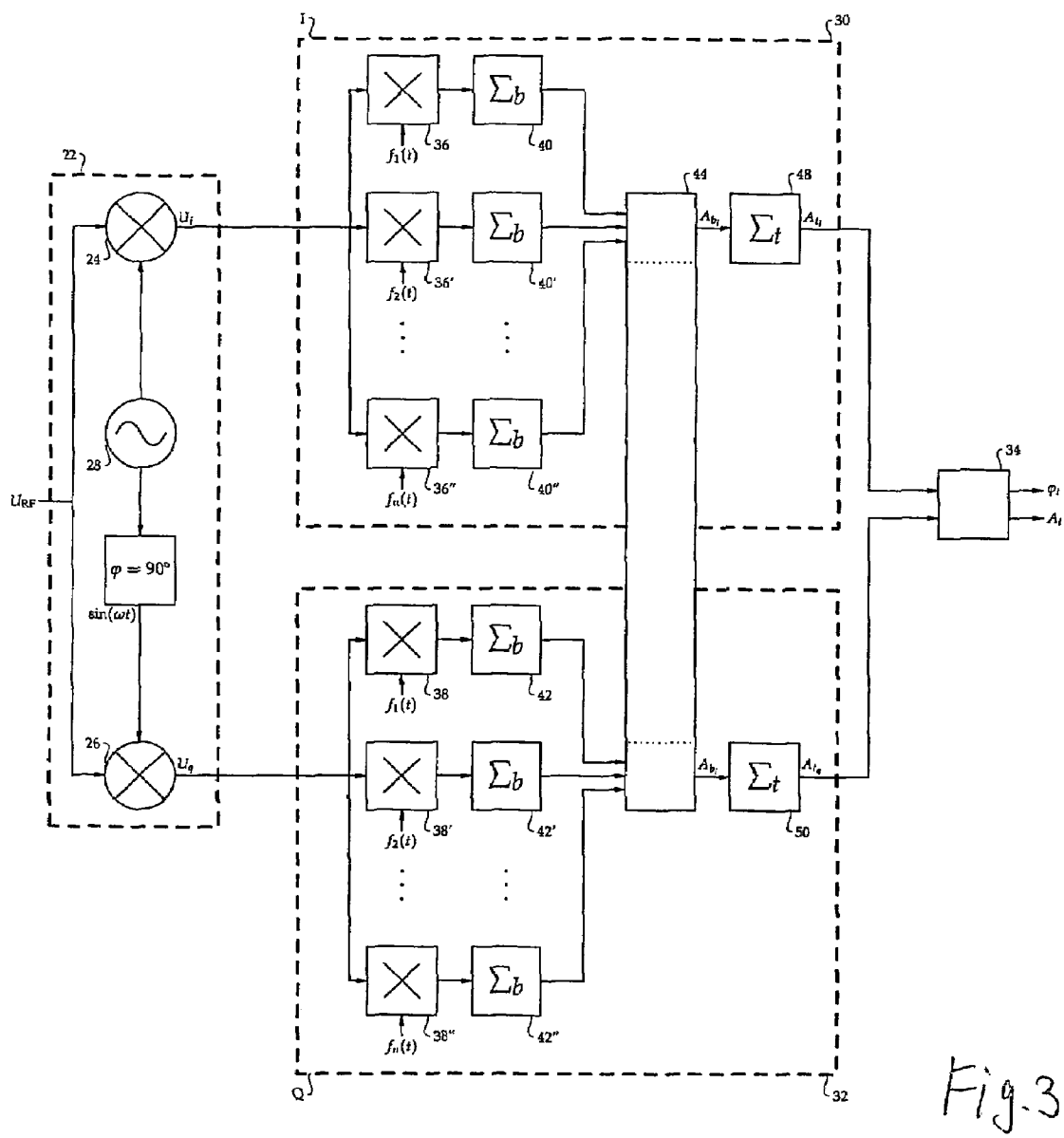
FIG. 3 shows a block diagram of an analysis circuit of the reader.

FIG. 3 shows a block diagram of an analysis circuit of the reader. The analysis circuit includes a first I/Q demodulator 22, comprising a first multiplier 24, a second multiplier 26 and a local oscillator 28. Both an input signal $U_{RF}$ and an oscillator signal from local oscillator 28 having the same frequency as the carrier frequency of input signal $U_{RF}$ arrive at first multiplier 24 and second multiplier 26.

The oscillator signal is supplied to first multiplier 24 as $U_{LO}*\cos(\omega t)$ and to second multiplier 26 phase-shifted through 90° as $U_{LO}*\sin(\omega t)$. After I/Q demodulator 22, the signal path is split into an in-phase channel I and a quadrature phase channel Q. Connected thereto are a signal processor 30 for the in-phase channel I and a signal processor 32 for the quadrature phase channel Q. Outputs from signal processor 30 for in-phase channel I and from signal processor 32 for quadrature phase channel Q lead to a computer 34, which carries out a trigonometric calculation of the phase angle and the amplitude.

Signal processors 30 and 32 include n multipliers 36, 36', 36"; 38, 38', 38" and summing units 40, 40', 40"; 42, 42', 42" for multiplying and summing the multiplication results of the signals of in-phase channel I and quadrature phase channel Q with evaluation functions $f_1(t)$, $f_2(t)$, $f_n(t)$, a shared amplitude evaluation unit 44 and one summing unit 48; 50 each for averaging over a plurality of evaluation periods.

Signals $U_I$ of in-phase channel I and signals $U_Q$ of quadrature phase channel Q are supplied to the respective multipliers 36, 36', 36"; 38, 38', 38" and multiplied by various evaluation functions $f_1(t)$, $f_2(t)$, $f_n(t)$ in the signal processor 30; 32. The evaluation functions each include a signal sequence of the detection microchip that is expected within an evaluation period and are distinguished, e.g. by the phase angle of the expected signal sequence. The multiplication occurs separately for each sampling value within the evaluation period (in digital signal processing, e.g. for each bit cycle). Then the products of multiplication for each sampling value within the evaluation period are summed by summing units 40, 40', 40"; 42, 42', 42".

Depending on the correspondence of the evaluation functions with the input signals originating from the detection microchips, different values are obtained for the summed multiplication products of the sampling values. The maximum values are evaluated and selected as amplitude values of the signal portions $A_{bI}$ for the in-phase channel I and $A_{bQ}$ for the quadrature phase channel Q by the shared amplitude evaluator 44 that comes next in succession. The subsequent summing units 48; 50 form average values of the amplitude values of the signal portions over multiple evaluation periods, e.g. via a complete data telegram of the detection microchip. The absolute amplitudes of the signals for in-phase channel I and for quadrature phase Q may also be determined through standardization.

Both the calculated amplitudes $A_{tI}$ of the signals for in-phase channel I and the calculated amplitudes $A_{tQ}$ of the signals for quadrature phase channel Q are fed to the computer 34, which is connected next. From these, computer 34 calculates phase angle $\phi_t$ and the resulting amplitude $A_t$ trigonometrically.

In the exemplary embodiment, it is assumed that the modulation states of the detection signal switch between A and B. Then the mathematical description of input signal $U_{RF}$ for modulator state A reads:

$$U_{RF-A} = U_A * \cos(x+\phi_A) + U_{KI} * \cos(x) + U_{KQ} * \sin(x)$$

and for modulator state B:

$$U_{RF-B} = U_B * \cos(x+\phi_B) + U_{KI} * \cos(x) + U_{KQ} * \sin(x)$$

The mathematical description of the product of multiplying modulator state A with the signal of the local oscillator for the I channel is as follows:

$$\cos(x) * U_{RF-A} = U_{AI}$$
$$= U_A/2 * \cos(\varphi_A) + U_A/2 * \cos(2x + \varphi_A) +$$
$$U_{KI}/2 * \cos(0) + U_{KI}/2 * \cos(2x) -$$
$$U_{KQ}/2 * \sin(0) + U_{KQ}/2 * \sin(2x)$$

and for the Q-channel:

$$\sin(x) * U_{RF-A} = U_{AQ}$$
$$= U_A/2 * \sin(\varphi_A) + U_A/2 * \sin(2x + \varphi_A) +$$
$$U_{KI}/2 * \sin(0) + U_{KI}/2 * \sin(2x) +$$
$$U_{KQ}/2 * \cos(0) - U_{KQ}/2 * \cos(2x)$$

and of modulator state B for the I-channel:

$$\cos(x) * U_{RF-B} = U_{BI}$$
$$= U_B/2 * \cos(\varphi_B) + U_B/2 * \cos(2x + \varphi_B) +$$
$$U_{KI}/2 * \cos(0) + U_{KI}/2 * \cos(2x) -$$
$$U_{KQ}/2 * \sin(0) + U_{KQ}/2 * \sin(2x)$$

and for the Q-channel:

$$\sin(x) * U_{RF-B} = U_{BQ}$$
$$= U_B/2 * \sin(\varphi_B) + U_B/2 * \sin(2x + \varphi_B) +$$
$$U_{KI}/2 * \sin(0) + U_{KI}/2 * \sin(2x) +$$
$$U_{KQ}/2 * \cos(0) - U_{KQ}/2 * \cos(2x)$$

When the high frequency portions are suppressed using a low-pass filter (not shown), the following expressions remain for the I-channel:

$$U_{AI} = U_A/2 * \cos(\phi_A) + U_{KI}/2$$

$$U_{BI} = U_B/2 * \cos(\phi_B) + U_{KI}/2$$

and for the Q-channel:

$$U_{AQ} = U_A/2 * \sin(\phi_A) + U_{KQ}/2$$

$$U_{BQ} = U_B/2 * \sin(\phi_B) + U_{KQ}/2.$$

After evaluation and averaging, the I-output returns voltage $$A_{tI} = U_I = U_B/2 * \cos(\phi_B) - U_A/2 * \cos(\phi_A)$$

and the Q-output returns the voltage $$A_{tQ} = U_Q = U_B/2 * \sin(\phi_B) - U_A/2 * \sin(\phi_A)$$

The phase angle is then $\alpha = \arctan(U_Q/U_I)$, and the resulting amplitude is $$A_t^2 = U_I^2 + U_Q^2.$$

The invention claimed is:

1. A method for locating a detection microchip that transmits a detection signal, which is received and evaluated by a reader, comprising determining the current distance between the reader and the detection microchip from a run-time-dependent characteristic of the received detection signal and propagation speed of electromagnetic waves, wherein:
the phase angle of the detection signal is evaluated as the run-time-dependent characteristic of the received detection signal,
a reference detection microchip is disposed at a reference distance from the reader in the vicinity of the detection microchips to be identified, wherein correction value for the reference distance is determined by comparing the measured phase angle to a reference phase angle, and the measured phase angle of the detection microchip to be identified is corrected with the correction value; and
multiple distance measurements are carried out at no less than two different antenna positions of the reader or a plurality of readers and the position of the detection microchip is determined from the intersection points of the distance position curves of the antenna positions of the reader or readers.

2. The method according to claim 1, wherein at least during a locating period, the detection microchip receives a carrier signal from the reader and transmits a detection signal that is modulated with a modulation signal and has the same frequency as the carrier signal, the modulation signal having signal points that are approximable by a straight line in a signal space diagram, wherein the detection signal received by the reader is demodulated, the difference between the phase angle of the detection signal and a reference phase angle is determined for a current distance between the detection microchip and the reader, and the current distance between the detection microchip and the reader is determined and from the difference of the phase angle, the carrier frequency and the propagation speed of the electromagnetic waves.

3. The method according to claim 1, wherein at least during a locating period, the detection microchip receives signals on a first and then at least a second frequency from the reader carrier and transmits detection signals, each modulated by a modulation signal and each having the same frequency as the carrier signals, the modulation signals having signal points that are approximable by a straight line in a signal space diagram, wherein the detection signals received by the reader are demodulated, the respective phase angle of each detection signal is determined and the current distance between the detection microchip and the reader is determined via shared analysis from the phase angles, the carrier frequencies and the propagation speed of the electromagnetic waves.

4. The method according to claim 1, wherein at least during a locating period, the detection microchip receives carrier signals on a first and simultaneously on at least one second frequency from the reader and transmits detection signals, being modulated by a modulation signal and each having the same frequency as the carrier signals, the modulation signals having signal points that are approximable by a straight line in a signal space diagram, wherein the detection signals received by the reader are split and demodulated by filters, the respective phase angle of the detection signal in question is determined, and the current distance between the detection microchip and the reader is determined from the phase angles, the carrier frequencies and the propagation speed of the electromagnetic waves via shared simultaneous analysis.

5. The method according to claim 1, wherein the phase angle is determined at least twice during the locating period with a time interval and a change of the phase angle in the time interval is determined as a relative movement between reader and detection microchip, while a correspondence is determined as a constant distance between reader and detection microchip.

6. The method according to claim 5, wherein the speed or directional vector of the movement is determined from the magnitude of the change of the distance or phase angle within a time interval.

7. The method according to claim 2 wherein the detection signal received by the reader is split into an in-phase and a quadrature component, one amplitude value each is determined from the in-phase and the quadrature components, and the phase angle is determined by a trigonometric function.

8. The method according to claim 7, wherein a resulting amplitude value is determined from the amplitude values of the in-phase and the quadrature components and the resulting amplitude value is evaluated for verification of the distance or at a known distance for testing the quality of a detection microchip.

9. The method according to claim 2, wherein during the locating period the detection signal is modulated with a signal that switches between at least two states, wherein the detection signal received by the reader is split into an in-phase component and a quadrature component in a demodulator and the in-phase component of the modulation signal is derived from the difference between the signal portions of the at least two states for the in-phase component and the quadrature component of the modulation signal is derived from the difference between the signal portions of the at least two states for the quadrature component, and wherein the phase angle is then determined trigonometrically from the in-phase component of the modulation signal and the quadrature component of the modulation signal.

10. The method according to claim 9, wherein the signal portions of the at least two states are evaluated over at least one evaluation period with at least two evaluation functions containing an expected signal sequence, and wherein an evaluation result returning a maximum amplitude is evaluated as the amplitude of the signal portions of the at least two states.

11. The method according to claim 9, wherein amplitudes of the signal portions of the at least two states are determined over multiple evaluation periods.

12. The method according to claim 1, wherein the reference detection signal of the reference detection microchip is modulated with a modulation signal differing from the modulation signal of the detection microchip to be identified, and the reference detection signal of the reference detection microchip and the detection signal of the detection microchip to be identified are separated by filters and simultaneously analyzed in the reader.

13. The method according to claim 1, wherein the different antenna positions are controlled by switching among multiple positionally separated antennae of the reader or readers.

14. The method according to claim 1, wherein after determination of the position of the detection microchip, the radiation lobe of an antenna array including at least two positionally separated antennae is aligned by phaseshifted control of the antennae in the direction of the detection microchip.

15. The method according to claim 1 wherein the detection microchip is activated from at least two different antenna positions before the distance measurement by the reader.

16. The method according to claim 3, wherein the detection microchip is activated on at least two different carrier frequencies before the distance measurement by the reader.

* * * * *